United States Patent [19]

Schmied et al.

[11] Patent Number: 4,784,193

[45] Date of Patent: Nov. 15, 1988

[54] FLOWMETER

[75] Inventors: Rudolf Schmied, Konolfingen; Peter V. Hafner, Liestal, both of Switzerland

[73] Assignee: Nestec S. A., Vevey, Switzerland

[21] Appl. No.: 2,809

[22] Filed: Jan. 13, 1987

[30] Foreign Application Priority Data

Jan. 22, 1986 [CH] Switzerland ............... 241/86

[51] Int. Cl.$^4$ ............................. B65B 1/30
[52] U.S. Cl. ..................................... 141/198
[58] Field of Search ............ 141/94, 95, 96, 198

[56] References Cited

U.S. PATENT DOCUMENTS 4,648,154 3/1987 Meinen et al. ............... 141/94

FOREIGN PATENT DOCUMENTS 8311725 9/1984 Fed. Rep. of Germany .
3339274 10/1984 Fed. Rep. of Germany .

Primary Examiner—Werner H. Schroeder
Attorney, Agent, or Firm—Vogt & O'Donnell

[57] ABSTRACT

A magnetically inductive flow meter having a measuring tube is positioned in a pipe line for measuring the flow of a fluid product in the pipe line for enabling control of a control element. The flow meter is aligned between a control element positioned in the pipe line, which is for influencing the flow of fluid product, and a drive unit associated with the pipe line, which is for actuating the control unit for influencing the fluid product flow. A mechanically displaceable actuating rod connected with the drive unit extends into the pipe line and extends axially through the measuring tube to a connection with the control element for actuating the control element by means of the drive unit.

11 Claims, 3 Drawing Sheets

FLOWMETER

BACKGROUND OF THE INVENTION

This invention relates to a device for monitoring and controlling a fluid product transported through a pipe, comprising a magnetically inductive flow meter, of which the measuring tube is introduced into the pipe, and a control element which influences the flow of the product and which is designed to be actuated by a drive unit via a mechanically displaceable rod-like actuator.

Devices of this type are used in particular as metering heads for filling containers with predetermined quantities of the fluid product. In this case, the control element is a valve which controls the flow of the product. By means of the magnetically inductive flow meter, it is possible to determine the quantity of product which has passed through the pipe since the opening of the valve. When the measured quantity of product corresponds to the preset quantity, the valve is closed. The use of a magnetically inductive flow meter affords the advantage that no moving parts or constrictions are situated in the flow path of the product. In this way, it is also readily possible thoroughly to clean the plant, including the flow meter, as required in particular for observing food regulations.

Devices of the type in question are known, for example, from DE-OS No. 33 39 274 and from DE-GM No. 83 11 725. In these known devices, the magnetically inductive flow meter is introduced into the pipe at a point situated upstream of the valve and its actuating mechanism in the direction of flow so that these components do not impair the operation of the magnetically inductive flow meter. Accordingly, the magnetically inductive flow meter is situated at a considerable distance from the outlet opening for the product. This can give rise to measurement errors through delayed response or afterflow of the product. In the device known from DE-GM No. 83 11 725, the valve is positioned at the actual outlet opening to prevent afterflow and is actuated by an actuating rod which extends axially through a filling tube forming the end section of the pipe. However, the magnetically inductive flow meter is again arranged in that part of the pipe which precedes the filling tube and, accordingly, is situated at a correspondingly large distance from the outlet opening and the valve.

The application of this known construction principle creates problems of space, particularly in filling plants comprising a relatively large number of metering heads situated closely adjacent one another for simultaneously filling a relatively large number of containers. In this case, each metering head must of course be equipped with its own magnetically inductive flow meter and the accommodation of the necessary number of magnetically inductive flow meters can cause difficulties, particularly in view of the short flow paths required.

SUMMARY OF THE INVENTION

The object of the present invention is to provide a device which, through its very compact construction, enables the magnetically inductive flow meter to be arranged at short distances from the control element without the operation of the magnetically inductive flow meter being adversely affected.

According to the invention, this object is achieved in that the magnetically inductive flow meter is introduced into the pipe between the drive unit and the control element and in that the rod-like actuator extends axially through the measuring tube of the magnetically inductive flow meter.

Because the rod-like actuator for the control element extends through the measuring tube of the magnetically inductive flow meter in the device according to the invention, the flow meter may be arranged as close as desired to the control element in the flow path, even if the control element is positioned directly at an outlet opening. In this way, it is possible in particular directly to introduce the magnetically inductive flow meter into the filling tube of a metering head lying at the end of the flow path, through which the actuating rod for the valve controlling the filling nozzle also extends. This provides for a very space-saving construction which, in particular, enables a relatively large number of metering heads to be accommodated in a compact arrangement.

Surprisingly, the operation of the magnetically inductive flow meter is not impaired, but actually improved, by the rod-like actuator extending axially through the measuring tube. There are several reasons for this. On the one hand, the available flow cross-section is reduced by the rod-like actuator so that, for the same product throughput, the flow rate is increased accordingly. Since a magnetically inductive flow meter produces a voltage which is proportional to the flow rate, the accuracy of measurement is thus improved. In addition, the flow rate, particularly of viscous or pasty products, is considerably more uniform in the annular intermediate space between the rod-like actuator and the wall of the measuring tube, to which the flow path is confined, than in a free tube cross-section and more uniform magnetic field strengths can also be obtained in this annular intermediate space. These effects also improve the accuracy of measurement of the magnetically inductive flow meter.

Finally, through special configurations of the rod like actuator, it is possible to influence the properties of the magnetically inductive flow meter in the desired manner. By selectively using rod-like actuators having different cross-sections, it is possible to obtain different flow cross-sections for the same magnetically inductive flow meter, so that the sensitivity of the measuring pick-up may be optimally adjusted. In addition, the rod-like actuator may consist at least partly of a soft magnetic material, at least in the region of the magnetically inductive flow meter, so that the magnetic resistance of the magnetic flux path is reduced, resulting in a lower energy demand. In addition, the field distribution in the annular flow passage may also be improved by the soft magnetic material. Where the rod-like actuator is axially displaceable for actuation of the control element and the soft-magnetic material is confined to the active region of the magnetically inductive flow meter, the axial displacement of the soft magnetic material changes the magnetic properties of the magnetically inductive flow meter, which may be used to monitor the displacement.

Finally, the compact, coaxial construction facilitates cleaning of the entire device, including the magnetically inductive flow meter. This is of major importance particularly where the device is used in the food industry.

Further advantages and features of the invention will become apparent from the following description of the embodiment which is shown in the accompanying drawings.

DETAILED DESCRIPTION OF THE EMBODIMENT OF THE DRAWINGS AND DESCRIPTION OF PREFERRED EMBODIMENTS

Figure 1:
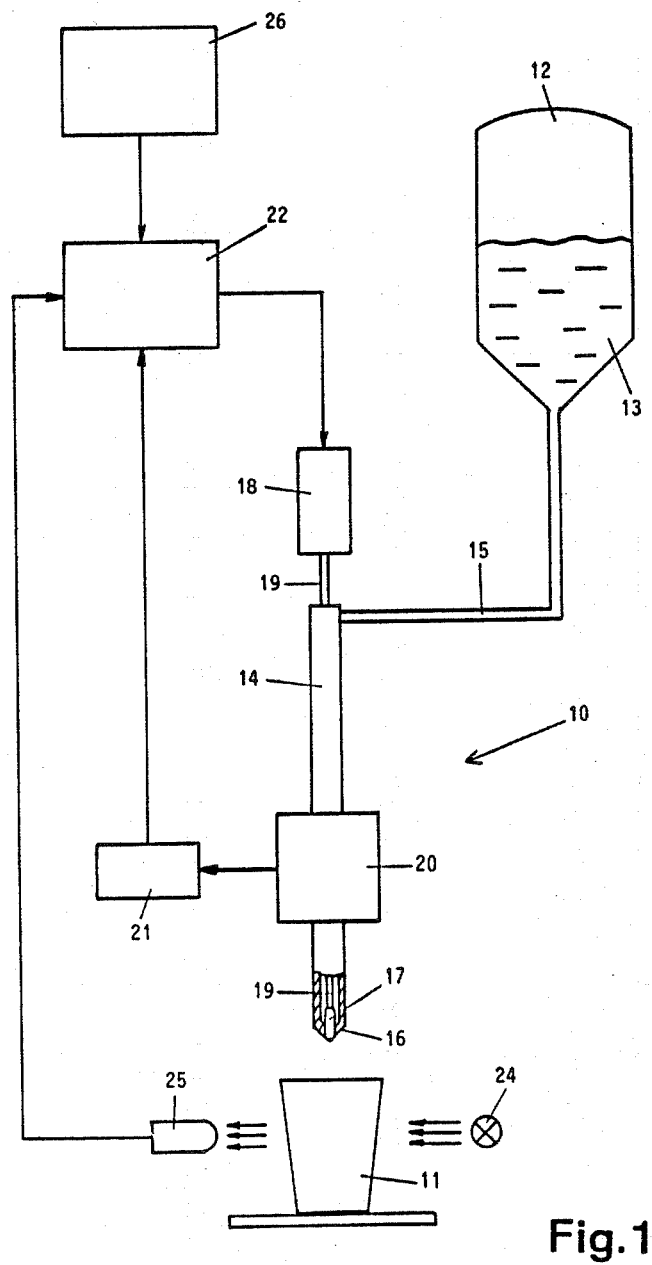
FIG. 1 diagrammatically illustrates the metering head of a filling plant.

FIG. 1 diagrammatically illustrates the metering head 10 of a filling plant which is designed to introduce predetermined quantities of a fluid product into containers 11. A storage container 12 contains the fluid product 13 to be filled into the containers 11; this product may be liquid to pasty. The metering head 10 comprises a rectilinear vertical filling tube 14 which, at its upper end, is connected by a pipe 15 to the container 12. A filling nozzle 16 is formed or arranged on the lower end of the filling tube 14. The filling nozzle 16 is closeable by a valve 17 which is operable by a drive unit 18 arranged over the upper end of the filling tube 14 through an actuating rod 19 which extends axially through the filling tube 14. In the embodiment illustrated, it is assumed that the valve 17 is opened and closed by a linear upward and downward movement. Accordingly, the drive unit 18 is designed in such a way that it displaces the actuating rod 19 in its axial direction. In this case, the drive unit 18 may be, for example, an electromagnet or even a hydraulic or pneumatic piston-and-cylinder unit.

A magnetically inductive flow meter 20 is installed in the filling tube 14 between the filling nozzle 16 and the drive unit 18, being designed in known manner in such a way that it supplies an electrical signal which is characteristic of the flow rate of the fluid product and hence, where the flow cross-section is known, of the product throughput as well. The output of the magnetically inductive flow meter 20 is connected to a computer 21 which calculates the amount of product delivered through the filling tube 14 and discharged through the filling nozzle from the output signal of the magnetically inductive flow meter 20 by integration. The output of the computer 21 is connected to a control unit 22 which controls the drive unit 18.

The containers 11 to be filled are brought successively beneath the filling nozzle 16. A light barrier formed by a light source 24 and a photocell 25 detects the presence of a container 11 beneath the filling nozzle 16. The output of the photocell 25 is connected to the control unit 22. Finally, a start-stop switch 26 likewise connected to the control unit 22 is present. The start-stop switch 26 enables the filling plant to be switched on and off.

The mode of operation of the filling plant shown in FIG. 1 is easy to understand. After it has been switched on by the start-stop switch 26, a container 11 is brought beneath the filling nozzle 16. The photocell 25 transmits a signal to the control unit 22 indicating that a container 11 is ready to be filled. The control unit 22 causes the drive unit 18 to open the valve 17 by means of the actuating rod 19. The product to be put into the container then flows through the filling tube 14, the magnetically inductive flow meter 20 and the filling nozzle 16 into the container 11. The magnetically inductive flow meter 20 transmits signals indicating the product throughput to the computer 21. The computer 21 continuously calculates the quantity of product delivered since the valve 17 opened, which is equal to the quantity introduced into the container 11 from the filling nozzle 16, and continuously feeds the result of this calculation to the control unit 22, for example in the form of pulses, each of which stands for a predetermined, small partial amount. In the control unit 22, the quantity of product introduced into the container is continuously compared with a preset value which represents the desired quantity of product to be introduced into each container 11. When the comparison shows that the quantity introduced into the container 11 corresponds to the preset value, the control unit 22 causes the drive unit 18 to close the valve 17. The same process is then repeated for each further container 11 which is brought beneath the filling nozzle 16.

Figure 2:
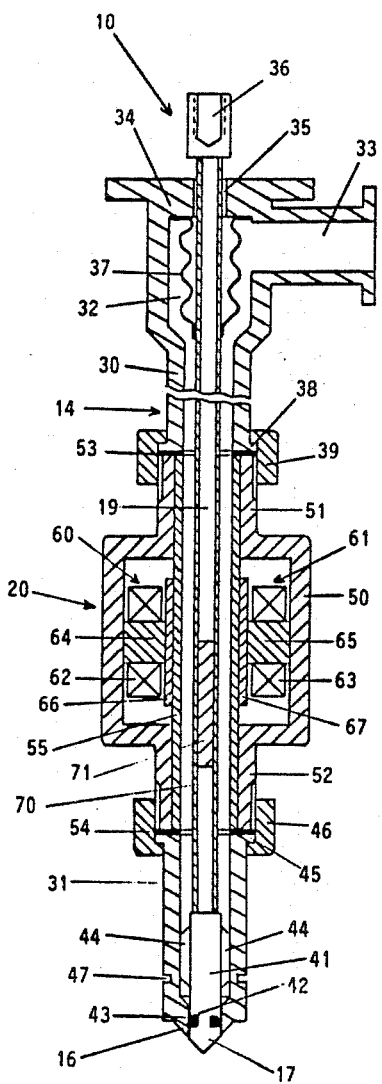
FIG. 2 shows the metering head of FIG. 1 in more detail with the valve closed.
Figure 3:
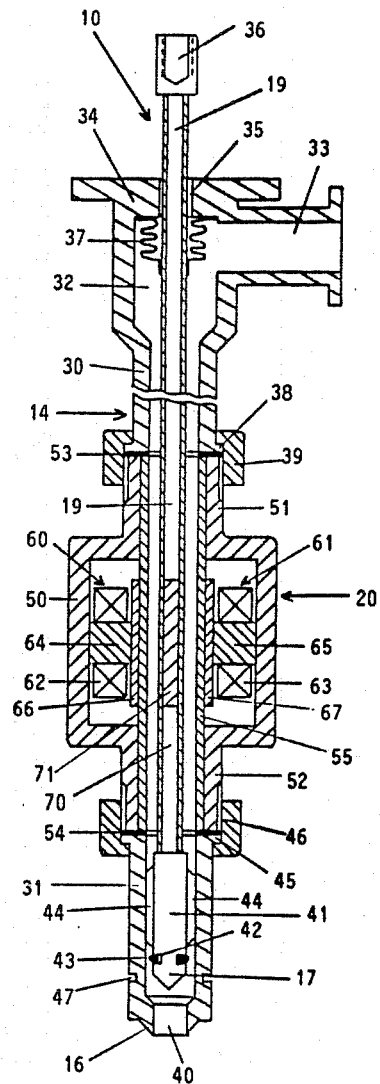
FIG. 3 shows the metering head with the valve open.

FIGS. 2 and 3 show the metering head 10 in more detail, the valve 17 being shown in its closed position in FIG. 2 and in its open position in FIG. 3. The filling tube 14 is divided into two sections 30 and 31 between which the magnetically inductive flow meter 20 is arranged. At its upper end, the upper filling tube section 30 has a widened part 32 into which a connecting socket 33 opens at a right angle. The connecting socket 33 is provided for the connection of the pipe 15 (FIG. 1). Immediately above the opening of the connecting socket 33, the upper filling tube section 30 is closed off by an end wall 34 which has a central opening 35 for the passage of the actuating rod 19. A threaded head 36 is arranged on that end of the actuating rod 19 which projects upwards from the central opening 35 for connection to the drive unit 18. Arranged in the widened part 32 is a folding bellow 37 which at its upper end is tightly connected to the end wall 34 and, at its lower end, to the actuating rod 19. The folding bellow 37 completely seals off the passage of the actuating rod 19 through the central opening 35 without impeding the axial displacement of the actuating rod. The widened part 32 enables the folding bellow 37 to be accommodated without unacceptably reducing the flow cross-section. Integrally formed with the filling tube section 30 at its lower end is a flange 38 which serves as a stop for a union nut 39.

The lower section 31 of the filling tube 14 contains the filling nozzle 16 and the valve 17. The filling nozzle 16 has a cylindrical outlet opening 40 (FIG. 3) and the valve 17 is formed by a cylindrical valve body 41 which fits slidingly into the outlet opening 40. The valve body 41 is fixedly connected to the lower end of the actuating rod 19 so that it is axially displaceable by the actuating rod 19. Near its lower end, the valve body 41 comprises an annular groove 42 in which sits an O-ring 43. In the closed position of the valve (FIG. 2), the O-ring 43 is situated in the outlet opening 40 so that it is tightly closed. In its open position (FIG. 3), the valve body 41 is completely withdrawn from the outlet opening 40 so that the product is able to flow out freely from the filling nozzle 16. Guide vanes 44 are arranged on the valve body 41, bearing slidingly on the inner wall of the filling tube section 31 to keep the valve body 41 exactly central even in its withdrawn position (FIG. 3).

Integrally formed with the lower filling tube section 31 at its upper end is a flange 45 which serves as a stop for a union nut 46. An annular groove 47, of which the purpose will be explained hereinafter, is arranged on the outside of the filling tube section 31 near the filling nozzle 16.

The magnetically inductive flow meter 20 has the usual construction. It may be a standard commercial magnetically inductive flow meter which is arranged between the two filling tube sections 30 and 31. It comprises a housing 50 integrally formed with two axial tube sockets 51 and 52 provided with external threads onto which the union nuts 39 and 46 can be screwed. In this way, the magnetically inductive flow meter 20 may be tightly fastened between the flanges 38 and 45 of the filling tube sections 30,31 with seals 53 and 54 in between.

A measuring tube 55 which has the same internal diameter as the adjoining filling tube sections 30 and 31 extends over the entire length of the magnetically inductive flow meter 20 inside the housing 50 and the tube sockets 51,52. The measuring tube 55 thus establishes the continuity of the flow path through the filling tube 14. Two electromagnets 60, 61 are arranged on two diametrically opposite sides of the measuring tube 55 in the housing 50 to generate a diametrically directed magnetic field inside the measuring tube 55. The electromagnet 60 has a magnetic field coil 62, a magnetic core surrounded by the field coil 62 and a pole shoe 66 in the form of a curved plate which adjoins the front of the magnetic core 64 and bears on the outer surface of the measuring tube 55. The electromagnet 61 consists similarly of a magnetic field coil 63, a magnetic core 65 and a pole shoe 67. When a current is passed through the magnetic field coils 62 and 63, the electromagnets 60, 61 produce a magnetic field inside the measuring tube 55 between the pole shoes 66 and 67, this magnetic field being directed perpendicularly of the axis of the measuring tube. The magnetic flux may return via the housing 50 where it consists of a soft magnetic material or even via a special magnet yoke.

The known mode of operation of a magnetically inductive flow meter of the type in question is based on Faraday's law of induction. When an electrically conductive liquid flows through the measuring tube 55, the magnetic field is directed perpendicularly of the direction of flow. Accordingly, a voltage is induced in the electrically conductive liquid which is proportional to the product of the magnetic field strength and the flow rate. For a constant field strength, therefore, this voltage is directly proportional to the flow rate. To tap this voltage, the magnetically inductive flow meter comprises two electrodes which are arranged diametrically opposite one another on the wall of the measuring tube 55, the diametral axis joining the two electrodes extending perpendicularly of the direction of flow and perpendicularly of the magnetic field axis, i.e., perpendicularly of the plane of the drawing in FIGS. 2 and 3. These electrodes are not visible in FIGS. 2 and 3 because one electrode is cut away while the other is concealed by the actuating rod 19.

The voltage tapped at the electrodes is converted by the electronics of the magnetically inductive flow meter 20 into a signal which is suitable for processing in the computer 21 and which indicates the product throughput, i.e., the amount of product flowing through the flow cross-section per unit of time.

A known requirement for the correct operation of a magnetically inductive flow meter of the type in question is that the surface of the measuring tube 55 which is in contact with the electrically conductive liquid should be electrically non-conductive. Accordingly, either the entire measuring tube has to consist of an insulating or very highly resistive material or its inner surface has to be covered with an insulating layer.

The actuating rod 19 passes axially both through the two filling tube sections 30 and 31 and also through the measuring tube 55 of the magnetically inductive flow meter 20. Accordingly, only the annular cross-section which remains free between the tube wall and the actuating rod, rather than the entire cross-section of these tubes, is available for the flow. The function of the magnetically inductive flow meter is not impaired in this way; on the contrary, it is improved for several reasons. One improvement arises out of the fact that, for a given product throughput, the flow rate is increased commensurate with the reduction in cross-section. Accordingly, the induced voltage tapped by means of the electrodes of the magnetically inductive flow meter is also larger. The sensitivity and accuracy of measurement of the magnetically inductive flow meter are thus increased.

Another significant improvement arises out of the fact that, particularly with viscous and pasty products, the flow conditions in the annular space between the actuating rod 19 and the measuring tube 55 are considerably more uniform than in a free tube cross-section. The magnetically inductive flow meter does of course measure only the mean value of the product of the magnetic field strength and the flow rate in the cross-section covered by the magnetic field. Accordingly, the result of the measurement is influenced by different flow rates in regions of different magnetic field strengths. The actuating rod 19 extending through the measuring tube 55 reduces these effects because both the flow rate and also the magnetic field strength are more uniform in the annular space than in a free tube cross-section.

Where the product to be measured has a relatively high electrical conductivity, there is no need for the actuating rod 19 to be insulated with respect to the product, even if it consists of metal. If, by contrast, the conductivity of the product is only very small against the conductivity of the actuating rod, that surface of the actuating rod 19 which comes into contact with the product must be insulated with respect to the product, for example by an insulating layer applied to the outer surface of the actuating rod, at least over the section lying inside the magnetically inductive flow meter.

Through special configurations of the actuating rod, it is possible to influence the properties of the magnetically inductive flow meter in the required manner. Thus, different flow cross-sections may be obtained for the same magnetically inductive flow meter by the use of actuating rods having different cross-sectional dimensions, so that the sensitivity of the flow meter may be optimally adapted to the particular application. The ratio of the external diameter of the actuating rod 19 to the internal diameter of the measuring tube 55 may be between 0.2 and 0.9, depending on the application. In addition, the magnetic properties of the magnetically inductive flow meter may also be improved if the actuating rod is made at least partly of a soft magnetic material, at least in the active region of the magnetically inductive flow meter. In this way, the air gap of the magnetic circuit is confined to the annular intermediate space actually used for the flow measurement and the magnetic resistance is reduced, so that a relatively low exciting energy is sufficient for generating the magnetic field. The field distribution in the annular air gap may also be favorably influenced by the soft magnetic material.

One particular embodiment of the actuating rod 19, in which use is made of the last-mentioned measure, is shown in FIGS. 2 and 3. The actuating rod 19 is not solid, but instead is formed by a hollow tube 70. The hollow tube 70 may consist of a non-magnetic metal, in which case it is covered with an additional insulating layer at least in the region of the magnetically inductive flow meter; alternatively, it may consist of an insulating or sufficiently highly resistive material, for example a plastics material. A soft magnetic material 71 is arranged inside the hollow tube 70, but is strictly confined to the region which, when the valve 17 (FIG. 3) is open, corresponds to the active region of the magnetically inductive flow meter 20 between the pole shoes 66 and 67. Accordingly, the soft magnetic material 71 produces the favorable effects described above during the flow measurement which only takes place with the valve open. By contrast, in the closed position of the valve 17 (FIG. 2), the soft magnetic material 71 is partly displaced from the active region of the magnetically inductive flow meter 20. The magnetic properties of the magnetically inductive flow meter are thus altered. This change in the magnetic properties may be detected by a suitable electronic circuit which may thus produce a signal indicating the displacement of the actuating rod 19. The correct closing and opening of the valve 17 may be monitored in this way. The change in the magnetic properties is not a disadvantage to the flow measurement, because no flow measurement takes place in the closed position of the valve.

The remainder of the hollow tube 70 may remain empty or may be filled with a non-magnetic material.

The embodiment described in the foregoing does of course lend itself to modification in many ways. In particular, the invention is not confined in its application to the operation of the valve of the metering head of a filling plant. Basically, it is suitable for any device in which the flow of a fluid product delivered through a pipe is measured by means of a magnetically inductive flow meter and is intended to be influenced by a control element actuated by a rod-like actuator. Nor is it necessary for the rod-like actuator to be axially displaced for actuation of the control element. The described advantages are also obtained when the rod-like actuator is merely rotated, as in the case of a shaft, or when it makes a combined rotating and axial movement, as in the case of a screw spindle.

Numerous possibilities also exist in regard to the configuration of the rod-like actuator. If the described monitoring of the displacement is dispensed with, which in any case is not possible with a pure rotating movement, the entire actuating rod may be a solid rod of a soft magnetic material. Providing the soft magnetic material is sufficiently highly resistive, as is the case with ferrites for example, there is also no need for an outer insulating layer.

FIG. 3 shows that, when the valve is open, the device as a whole may readily be cleaned and sterilized very thoroughly by introducing a cleaning liquid instead of the product to be packed through the connecting socket 33. By virtue of the co-axial structure without any projecting parts or dead angles, the cleaning liquid is able to flow through unimpeded and thoroughly to rinse all surfaces coming into contact with the product.

Figure 4:
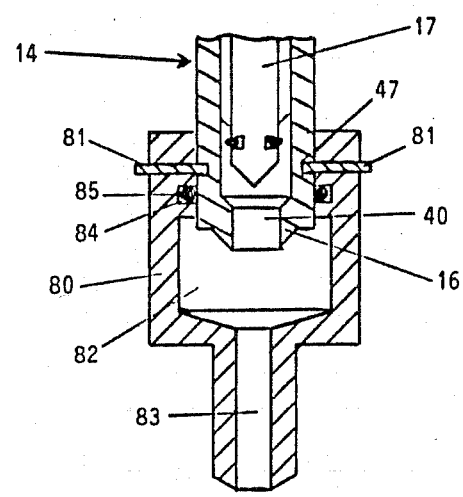
FIG. 4 shows the filling nozzle of the metering head with a cleaning attachment.

FIG. 4 shows an attachment which also enables the outside of the filling nozzle 16 to be thoroughly cleaned. To this end, an adaptor 80 is pushed over the lower end of the filling tube 14 and held by means of a detent 81 engaging in the annular groove 47. The adaptor 80 has a chamber 82 surrounding the filling nozzle 16 and an outlet 83 of reduced cross-section. The outlet 83 produces a counter pressure for the flow of the cleaning liquid, so that it fills the chamber 82 and thoroughly washes the outside of the filling nozzle 16. An O-ring 85 inserted in the inner annular groove 84 of the adaptor 80 seals off the chamber 82 at its upper end.

We claim:

1. In a device for monitoring and controlling flow of a fluid product delivered through a pipe line wherein the device includes a control element for influencing the flow of the product in the pipe line, a drive unit for actuating the control element by means of a mechanically displaceable actuating rod extending to the control element and a magnetically inductive flow meter having a measuring tube for measuring fluid product flow for enabling control of the control element, the improvement comprising a pipe line having a magnetically inductive flow meter being positioned and aligned in the pipe line between a drive unit associated with the pipe line and a control element positioned in the pipe line and having an actuating rod being connected with the drive unit extending into the pipe line and axially through a measuring tube of the magnetically inductive flow meter and extending to and being connected with the control element for actuating the control element for influencing fluid product flow.

2. A device according to claim 1 wherein the actuating rod is displaceable in an axial direction for actuating the control element.

3. A device according to claim 1 wherein the actuating rod is rotatable for actuating the control element.

4. A device according to claim 1 wherein the control element is a valve for controlling the flow of the fluid product.

5. A device according to claim 1 wherein the device is a metering head having an outlet opening for filling containers with the fluid product.

6. A device according to claim 5 further comprising an adaptor, for cleaning and sterilizing the metering head outlet opening, associated and fitted with the outlet opening of the metering head device and having a chamber surrounding the metering head outlet opening and having an outlet of lesser cross-section than the metering head outlet opening.

7. A device according to claim 1 wherein at least a part of the actuating rod which comes into contact with fluid product in the pipe line is covered on its surface with a layer of an insulating material.

8. A device according to claim 7 wherein the part of the actuating rod which is covered with the insulating material is at least that part which extends within the magnetically inductive flow meter.

9. A device according to claim 1 wherein the part of the actuating rod which extends within the magnetically inductive flow meter is made at least partly of a soft magnetic material.

10. A device according to claim 9 wherein the actuating rod is axially displaceable for actuating the control element to an open and to a closed position, the soft-magnetic material is confined to that part of the activating rod which, in the open position of the valve, extends within an active region of a magnetic circuit of the magnetically inductive flow meter and wherein a circuit is provided for producing a signal depending upon changes in magnetic properties of the magnetic circuit for monitoring actuation of the control element.

11. A device according to claim 9 or 10 wherein the actuating rod is a tube which contains the soft magnetic material in its interior.

* * * * *